Oct. 11, 1932.  A. GASTONGUAY ET AL  1,881,469
MOTION PICTURE PROJECTOR
Filed Aug. 10, 1929
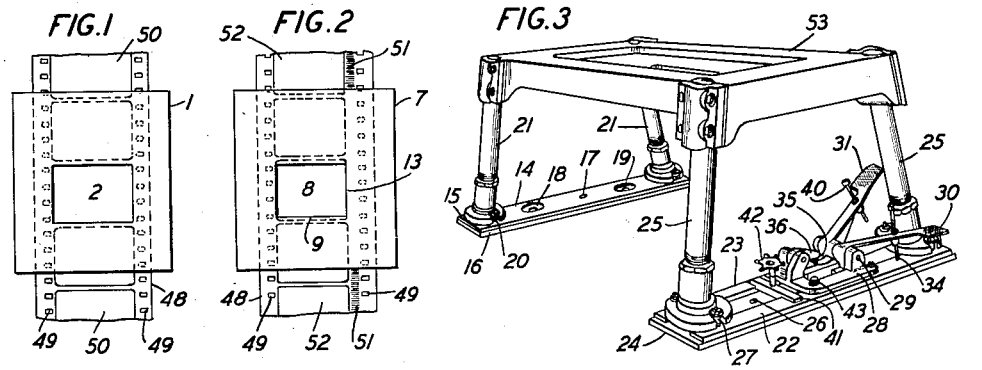
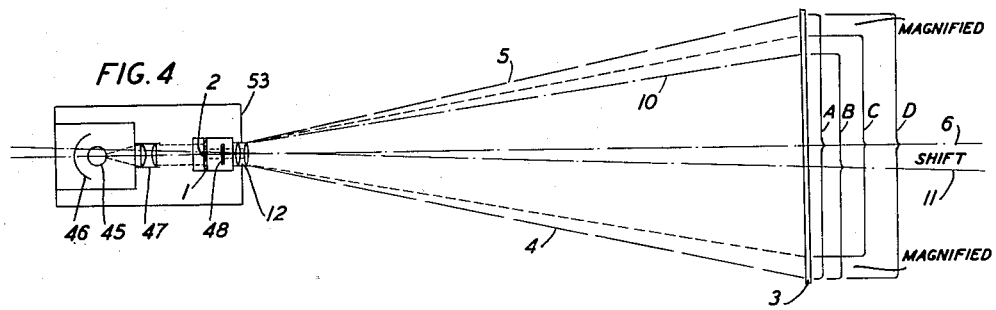
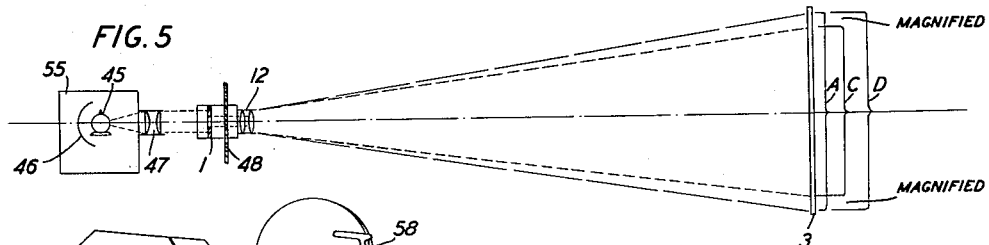
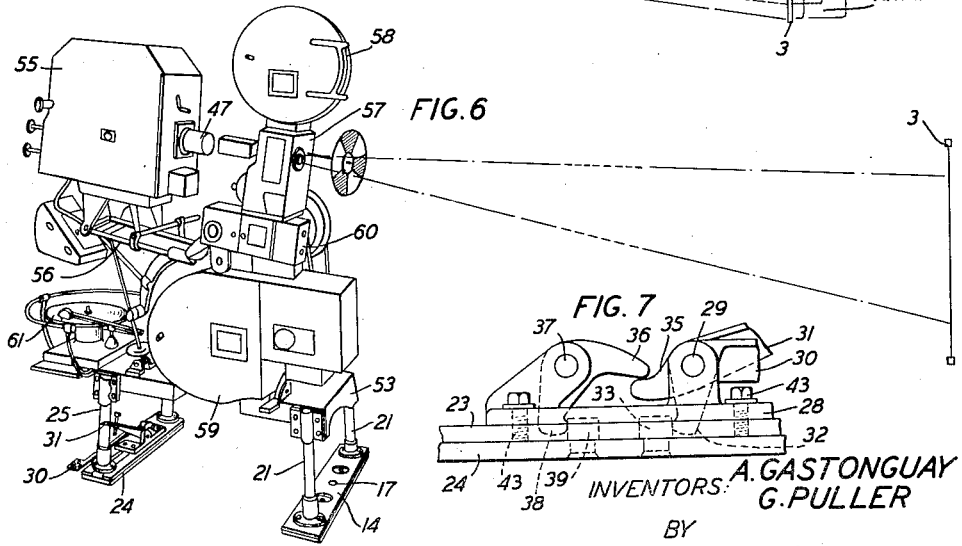
INVENTORS: A. GASTONGUAY
G. PULLER
BY G. H. Heydt
ATTORNEY Patented Oct. 11, 1932

1,881,469

UNITED STATES PATENT OFFICE

ANTONIO GASTONGUAY, OF NEW YORK, AND GEORGE PULLER, OF PORT WASHINGTON, NEW YORK, ASSIGNORS TO BELL TELEPHONE LABORATORIES, INCORPORATED, OF NEW YORK, N. Y., A CORPORATION OF NEW YORK

MOTION PICTURE PROJECTOR

Application filed August 10, 1929. Serial No. 384,923.

This invention relates to motion picture projectors and particularly to projectors for both silent motion pictures and sound pictures of the film type.

The object of this invention is a method and means for readily adapting a projector to show either silent motion pictures or sound pictures.

A feature of this invention is an aperture plate and optical system to project a sound picture having the same dimensions on the screen as a silent picture.

Another feature of this invention is a conviently adjustable mechanism to shift the projector and thus change the angle of projection by a predetermined amount.

In a sound picture film, the sound record is commonly placed on one side of the film close to the perforations, and the width of the picture is correspondingly reduced. The height of the picture on the sound film is regulated by the distance the film is moved by each operation of the intermittent action, and for practical reasons, the height of the picture in both silent and sound films is the same. In many motion picture theatres, the reflecting area of the screen is surrounded by a dark border which outlines an area equal to the projected area of a silent picture. As a result, when sound pictures are projected with the sound record masked off, the projected area of the sound picture will not cover the screen. By means of a special optical system, the width of the projected sound picture may be magnified to cover the screen but the height will be enlarged in the same ratio and will then be too large for the screen. A special aperture plate is provided which not only masks off the sound track, but reduces the height so that when the sound picture is projected through the special optical system it will have the same dimensions as the screen.

The sound picture, however, will be laterally displaced on the screen due to the sound record having been masked off one side. The direction of projection must thus be rotated horizontally to centre the sound picture on the screen. The projector head could be rotated through a small angle with respect to the base but this would be objectionable as the take-up reel is usually secured to the base and the rotation of the projector head would introduce a twist in the film. Another method is to laterally displace one end of the projector about a pivot at the other end. The pivot may be placed at either end of the projector, but as the projection ports in many theatres are comparatively small, the rear end is preferably displaced about a pivot at the front end so that the projector beam is not displaced enough to strike the side of the port.

In a preferred embodiment of this invention, a sub-base, comprising two flat plates, superimposed and pivoted, is placed under the front of the projector base. Another sub-base, comprising flat superimposed plates, is placed under the rear of the projector. By means of suitable angle levers, the upper plate may be slid longitudinally on the lower plate, displacing the rear of the projector laterally and rotating the direction of projection through a small horizontal angle.

Referring to the drawing,

Fig. 1 shows an aperture plate and film for silent pictures;

Fig. 2 shows an aperture plate and film for sound pictures;

Fig. 3 shows the sub-bases in position under the projector base;

Fig. 4 shows a plan view of the projector and screen;

Fig. 5 shows an elevation of the projector and screen;

Fig. 6 shows a general view of the projector and bases and the screen—and

Fig. 7 shows the operating levers in detail.

Referring to the drawing, Fig. 4 diagrammatically illustrates a plan view of the optical system of a motion picture projector mounted on a base 53. Light from a suitable source 45 is collected by the reflector 46 and focussed by the condensing lens 47 on an aperture 2 in an opaque plate 1. A motion picture film 48 may be moved past the aperture 2 by the known film progressing mechanism of the projector. The picture is projected by an objective lens 12 on a screen 3.

An opaque plate 1 of any suitable material is pierced by an aperture 2 of such dimensions as to define the outline of the projected silent picture fancifully illustrated by the squares 50, 50 centrally located between the perforations 49, 49 in the film 48. The motion pictures are commonly contained within an area of the order of 0.91 inch laterally of the film and of the order of 0.68 inch lengthwise of the film. The projected silent picture will then cover the screen 3 between the lines 4 and 5, equally spaced from the center line 6 as indicated by the bracket A.

A similar opaque plate 7 of any suitable material is pierced by an aperture 8 having the side 9 shorter than the corresponding side of the aperture 2 so as to mask off the sound record 51, which is commonly located inside one row of perforations 49 on a film base 48 of the same width as the silent picture film. The motion pictures are fancifully illustrated by the squares 52, 52. Owing to the presence of the sound record 51, the motion pictures will now be contained within an area having a dimension of the order of 0.80 inch laterally of the film. The motion picture may, however, have the same dimension lengthwise of the film as the silent picture. The resulting picture will then be more nearly a square than the silent picture. A sound picture using the aperture plate 7 and projected under the same conditions as the silent picture will only cover the portion of the screen 3 defined by the lines 4 and 10, equally spaced from a center line 11 as indicated by the bracket B. In order to center the sound picture on the screen 3 the line of projection must be rotated horizontally till the center line 11 coincides with the center line 6. A preferred method of rotating the line of projection is disclosed in Figs. 3 and 7 described below.

When the sound picture is centered on the screen, due to the aperture 8 being smaller than the aperture 2 the projected picture will not cover the screen as indicated by the bracket C. The projection lens 12 is replaced by a special lens having the same aperture as lens 12 but having a focal length of the order of one-half inch less than the focal length of lens 12 which magnifies the sound picture so that the projected sound picture covers the screen between the lines 4 and 5 as indicated by the bracket D.

Due to the magnification produced by the special lens, the height of the projected sound picture will be increased in the same proportion as the width and will be too large for the screen. To avoid this increase in height the side 13 of the aperture 8 is made smaller than the corresponding side of the aperture 2 by the same ratio as the side 9 was made smaller than the corresponding side of the aperture 2 and may conveniently have a dimension of the order of 0.61 inch lengthwise of the film. The reduction of the length of the side 13 will mask off a portion of the sound picture. The aperture 8 is preferably so located in the plate 7 that equal portions are masked off the top and bottom of the picture as diagrammatically illustrated in Fig. 5, in which the reference characters refer to the same conditions as the similar characters in Fig. 4, though in some cases it may be preferable that the portions be unequal, or even that all be masked off the bottom.

A general view of the projector and screen is shown in Fig. 6. The light source 45 and reflector 46 are contained within the lamphouse 55 mounted on the bracket 56. The light from the lamp-house 55 is focussed by the condensing lens 47 on the projector head 57 containing the opaque plate 1, the objective lens 12 and the mechanism for progressing the film from the reel 58, through the picture projection head 57 and the film sound reproducing head 60 to the reel 59. The lamp-house 55, picture projection head 57, and film sound reproducing head 60 are mounted on the projector base 53, supported by the legs 21, 25 resting on the sub-bases 14, 24. The projected picture is displayed on the screen 3. A disc sound reproducing equipment 61 may also be mounted on the base 53. It will be understood that the term "silent motion picture" refers to the size of the photographic image, and may be a full-size image which is displayed synchronously with the reproduction of sound by the disc sound reproducing equipment 61.

A convenient method of rotating the line of projection to bring the center line 11 into coincidence with the center line 6 is to laterally displace one end of the projector about a pivot at the other end. A sub-base 14, Fig. 3 comprising two superimposed flat plates 15 and 16, pivoted at 17 are placed under laterally opposed feet of the projector base 53, preferably under the front feet. Plate 16 may be secured to the floor by means of screws 18 inserted through the large holes 19 in plate 15 and bearing on plate 16. The feet 21 of the projector base 53 may be secured by bolts 20 to the plate 15. Due to the pivotal connection 17, plate 15 may be rotated through a small angle with respect to plate 16.

A sub-base comprising two flat plates 22 and 23, Figs. 3 and 7, superimposed on a plate 24 is placed under the other pair of feet 25 of the projector base 53. Plate 24 may be secured by screws 26 to the floor. The feet 25 of the projector may be secured by bolts 27 to plates 22 and 23. A casting 28 extends across the width of plate 24 and is secured by screws 43 to plates 22 and 23. A shaft 29 is supported in bearings journalled in suitable bosses formed in casting 28 and supports two levers 30 and 31. Lever 30 terminates in a projection 32 which bears against the abutment 33 affixed to the plate 24 and located between the plates 22 and 23. Depressing lever 30 will cause the projection 32 to be pressed against the abutment 33 and the reaction will cause the casting 28 to slide the plates 22 and 23 longitudinally along plate 24 laterally displacing the feet 25 of the projector. The amount of the movement is regulated by the set screw 34 which limits the movement of lever 30. Lever 31 terminates in a projection 35 which engages the arm 36 of an angle lever mounted on a shaft 37 journalled in suitable bosses on the casting 28. The other arm 38 of the angle lever bears against an abutment 39 affixed to the plate 24. Depressing lever 31 will cause the projection 35 to force the lever arm 36 upward causing the lever arm 38 to be pressed against the abutment 39 and the reaction will cause casting 28 to slide the plates 22 and 23 longitudinally along plate 24 in the opposite direction to the movement resulting from the depression of lever 30 and thus returning the rear feet 25 of the projector to their original position, and restoring lever 30 to its initial position. The amount of the movement is regulated by the set screw 40 which limits the movement of lever 31.

To prevent the plates 22 and 23 from being moved along the plate 24 by the vibration of the projector, a screw (not shown) secured to the plate 24 passes through the plate 41 and is engaged by the hand wheel 42. Rotating the hand wheel 42 will clamp plate 41 to plates 22 and 23 and prevent relative movement of plates 22, 23 and 24.

What is claimed is:

1. The method of adapting a motion picture projector to show sound pictures which comprises masking the sound picture to have the same relative proportions as a silent motion picture, projecting the masked sound picture enlarged to the same area as the projected silent picture and rotating the direction of projection to center the sound picture on the screen.

2. The method of adapting a motion picture projector to show sound pictures which comprises masking off the sound record, masking off a portion of the height of the sound picture to the same relative proportions as a silent picture, projecting the masked sound picture enlarged to the same dimensions as the projected silent picture and displacing the direction of projection to center the sound picture on the screen.

3. The method of adapting a motion picture projector to show sound pictures which comprises masking the sound picture to the same ratio of dimensions as the silent picture, projecting the masked sound picture enlarged to the same dimensions as the projected silent picture and displacing one end of the projector to center the projected picture on the screen.

4. The method of adapting a motion picture projector to show sound pictures which comprises masking the sound picture to the same ratio of dimensions as the silent picture, projecting the masked sound picture enlarged to the same dimensions as the projected silent picture and displacing the rear end of the projector to center the projected picture on the screen.

5. The method of adapting a motion picture projector to show sound pictures which comprises masking the sound picture to the same ratio of dimensions as the silent picture, projecting the masked sound picture enlarged to the same dimensions as the projected silent picture and displacing the rear end of the projector about a pivot at the front end to center the projected picture on the screen.

6. Means for adapting a motion picture projector to show a sound picture film comprising, in combination, an aperture plate to mask off the sound record and a portion of the action pictures on said sound picture film, an optical system to project an enlarged image of said masked picture, a pivoted sub-base under the front of said projector, a slidable sub-base under the rear of said projector and means for actuating said slidable sub-base to shift the rear of said projector laterally about said pivoted sub-base.

In witness whereof, we hereunto subscribe our names this 2 day of August, 1929.

ANTONIO GASTONGUAY.
GEORGE PULLER.